No. 891,642. PATENTED JUNE 23, 1908.
C. TIETZMANN.
MACHINE FOR MAKING PAPER CUPS.
APPLICATION FILED JAN. 21, 1907.

8 SHEETS—SHEET 1.

WITNESSES

INVENTOR
Charles Tietzmann
BY
ATTORNEYS

No. 891,642. PATENTED JUNE 23, 1908.
C. TIETZMANN.
MACHINE FOR MAKING PAPER CUPS.
APPLICATION FILED JAN. 21, 1907.

8 SHEETS—SHEET 2.

WITNESSES
INVENTOR
Charles Tietzmann
BY
ATTORNEYS

No. 891,642. PATENTED JUNE 23, 1908.
C. TIETZMANN.
MACHINE FOR MAKING PAPER CUPS.
APPLICATION FILED JAN. 21, 1907.

8 SHEETS—SHEET 4.

WITNESSES

INVENTOR
Charles Tietzmann
BY Munn & Co
ATTORNEYS

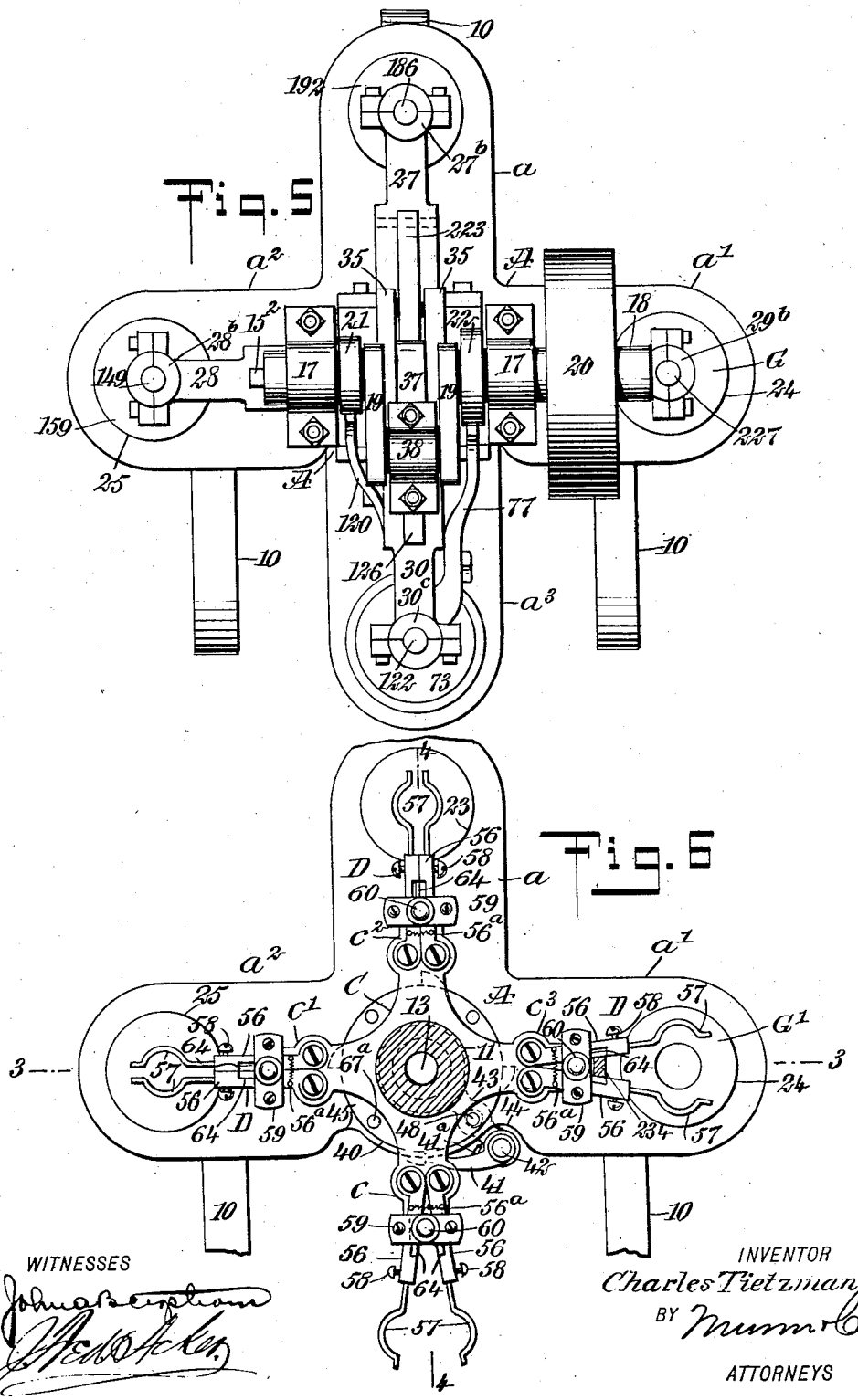

No. 891,642. PATENTED JUNE 23, 1908.
C. TIETZMANN.
MACHINE FOR MAKING PAPER CUPS.
APPLICATION FILED JAN. 21, 1907.
8 SHEETS—SHEET 6.
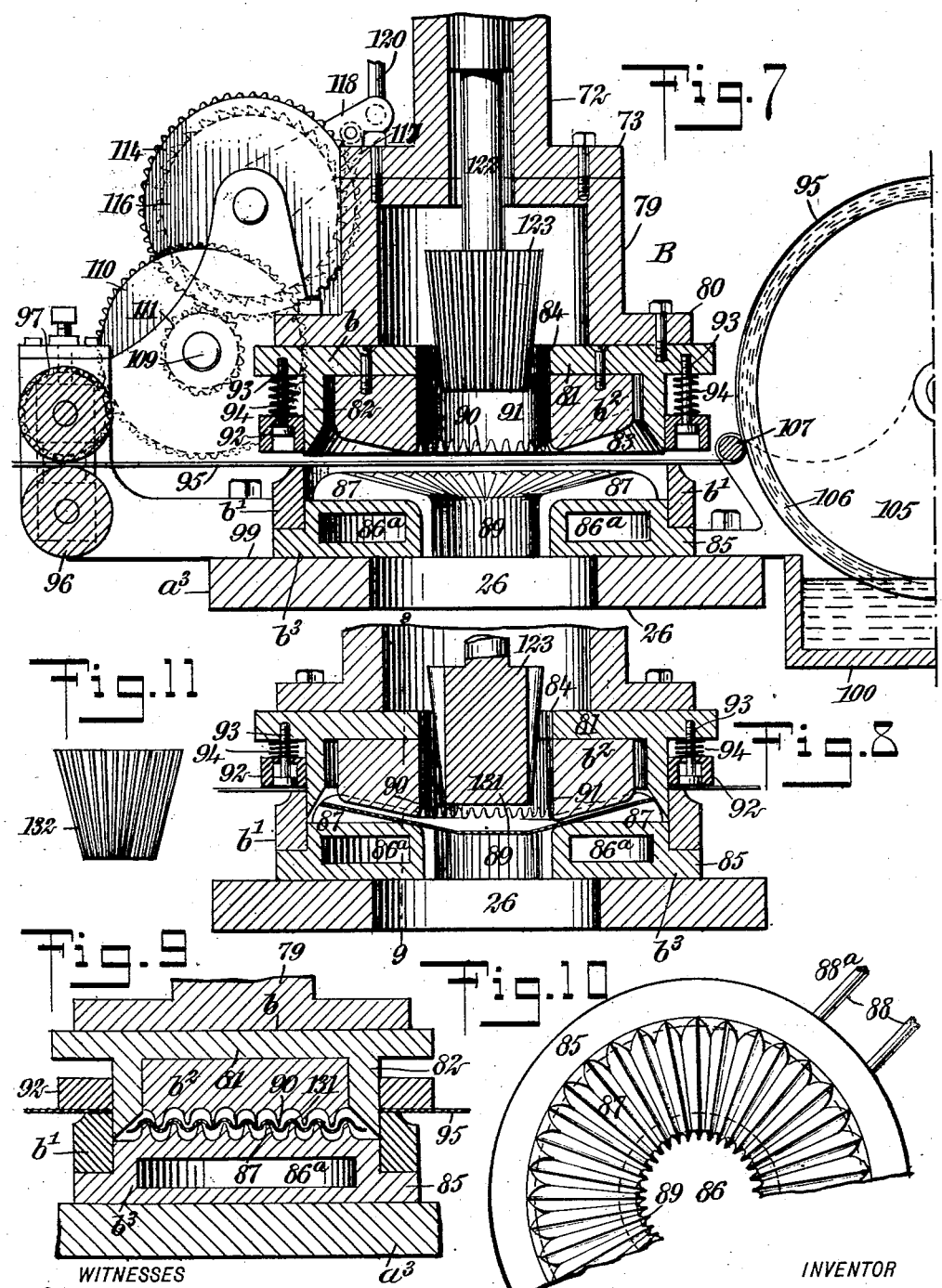
INVENTOR
Charles Tietzmann
BY Munn & Co
ATTORNEYS

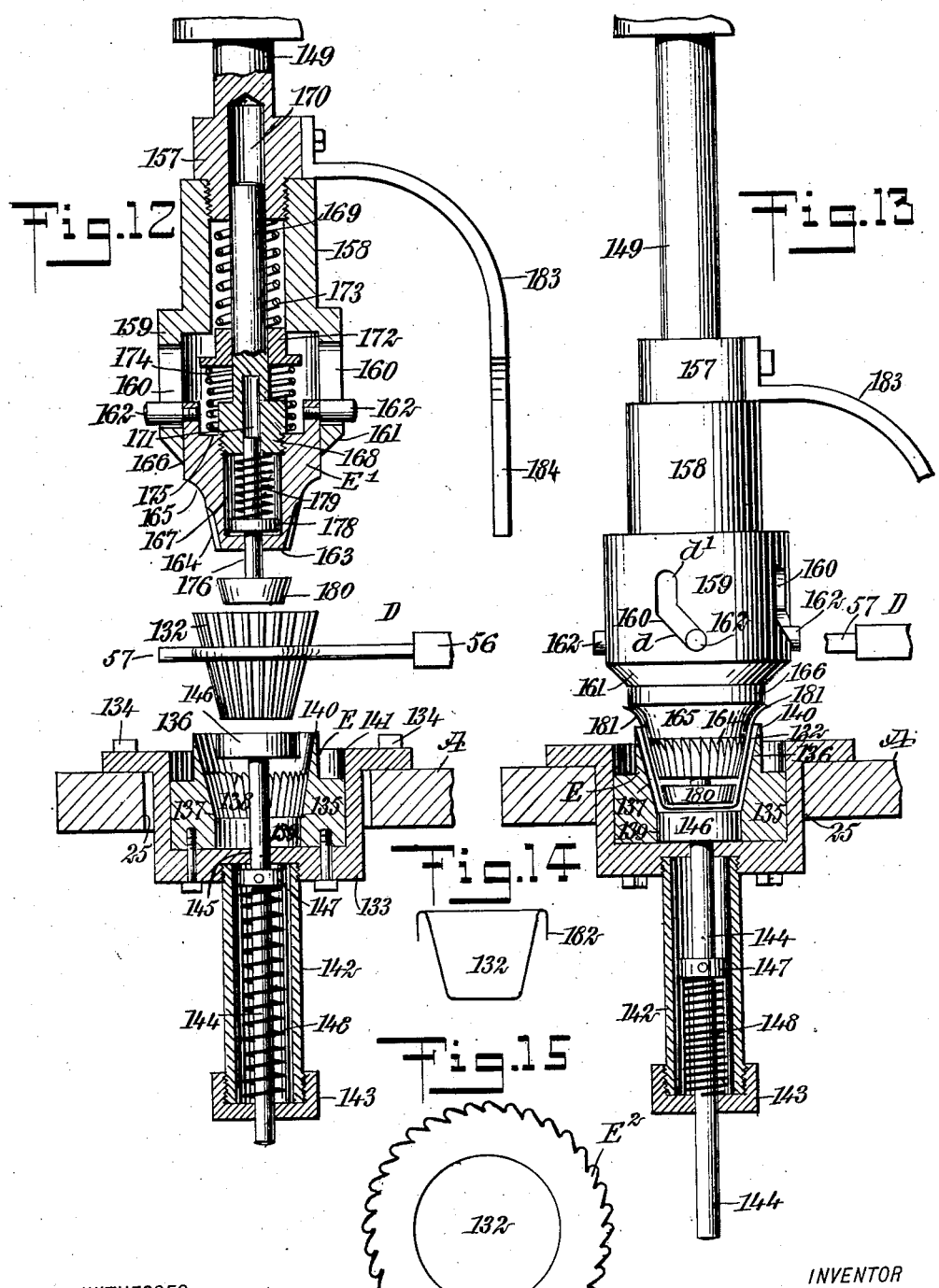

No. 891,642. PATENTED JUNE 23, 1908.
C. TIETZMANN.
MACHINE FOR MAKING PAPER CUPS.
APPLICATION FILED JAN. 21, 1907.
8 SHEETS—SHEET 8.
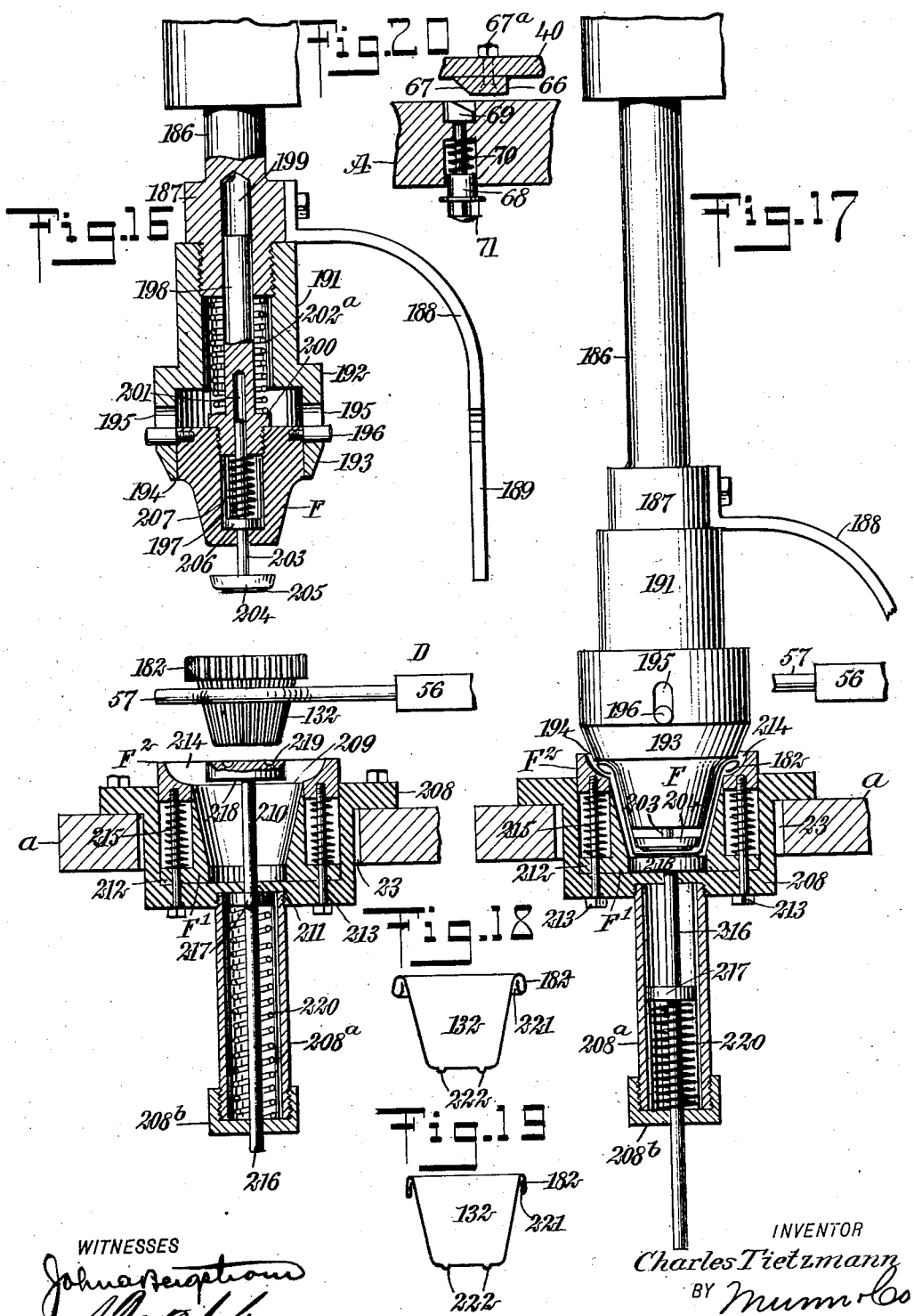
WITNESSES
INVENTOR
Charles Tietzmann
BY Munn & Co
ATTORNEYS

UNITED STATES PATENT OFFICE.

CHARLES TIETZMANN, OF NEW YORK, N. Y.

MACHINE FOR MAKING PAPER CUPS.

No. 891,642.  Specification of Letters Patent.  Patented June 23, 1908.

Application filed January 21, 1907. Serial No. 353,233.

*To all whom it may concern:*

Be it known that I, CHARLES TIETZMANN, a citizen of the United States, and a resident of the city of New York, Long Island City, borough of Queens, in the county of Queens and State of New York, have invented a new and Improved Machine for Making Paper Cups, of which the following is a full, clear, and exact description.

The invention relates to machines especially adapted for making fluted or corrugated paper cups adapted to contain comfits and the like.

The purpose of the invention is to provide a machine of the character mentioned which will be exceedingly simple, durable, economic and capable of being operated by power, the machine being so constructed that it will cut, corrugate and shape the cups from sheets of paper automatically fed from a roll and will further form the required flange at the edge or margin of the cup, giving to said flange in one operation the first turn or fold and in the second operation the second or final turn or fold, and in a final operation to clench or flatten the completed flange and discharge the completed cup from the machine.

Another purpose of the invention is to provide a machine of the type mentioned which will be automatic and continuous in all of its operations.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
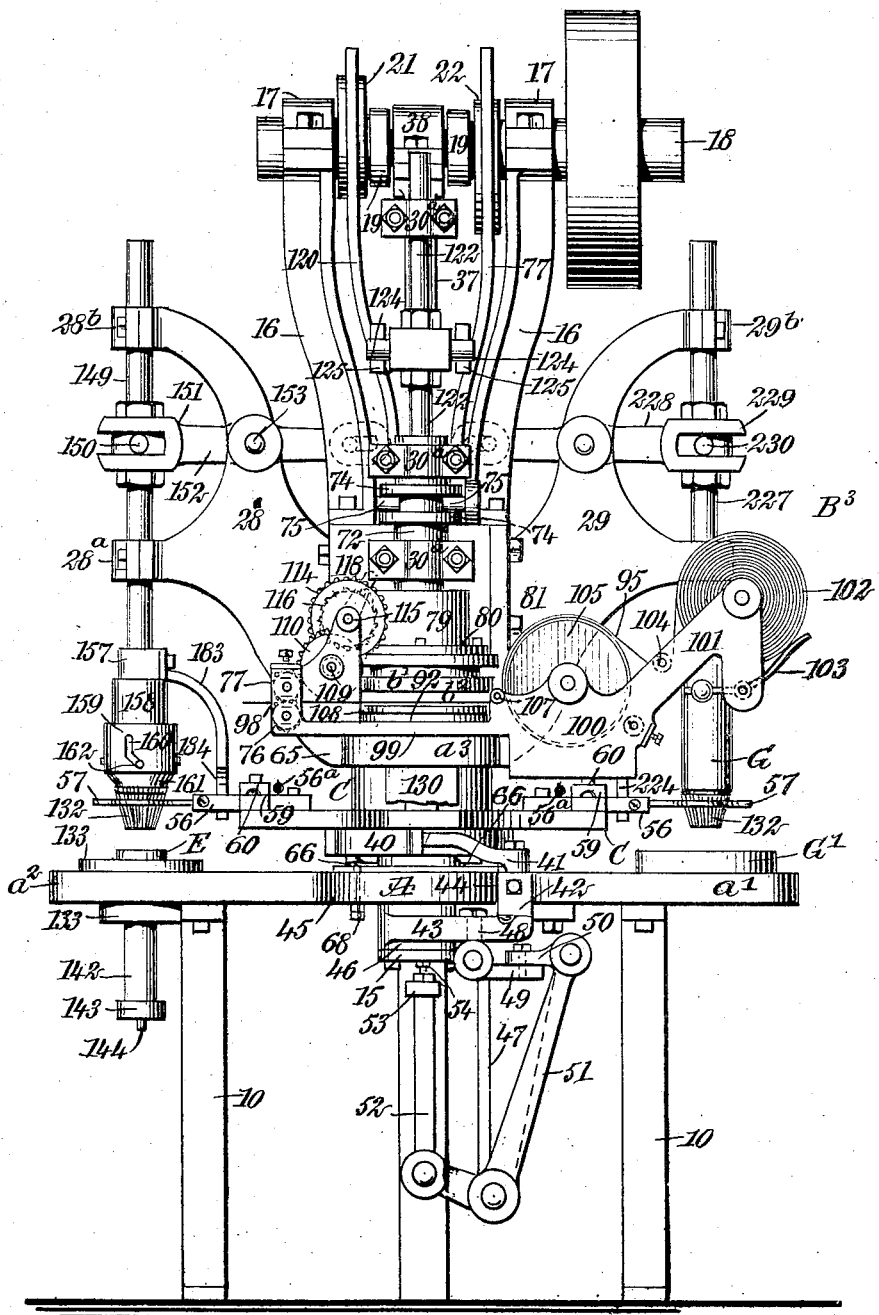
Figure 2:
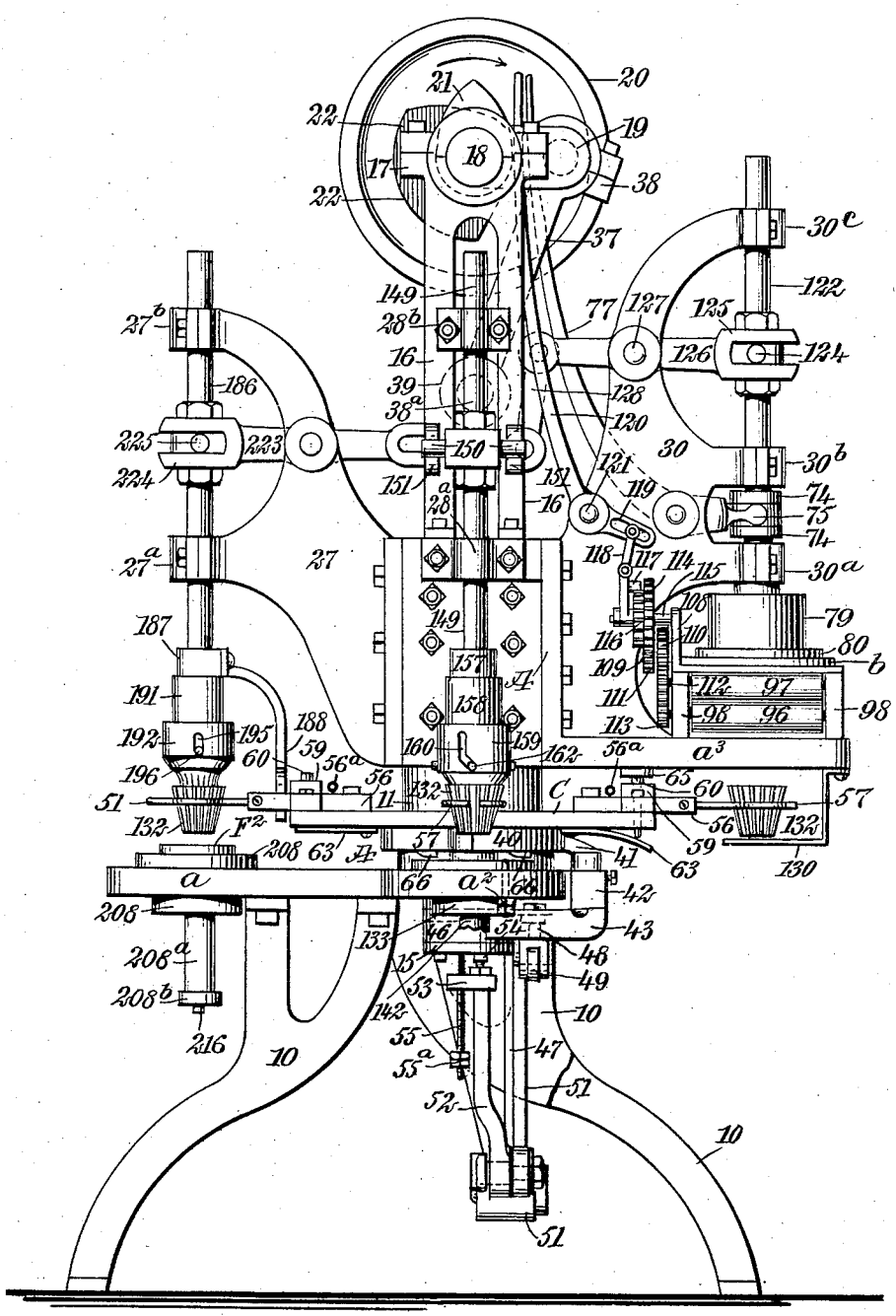
Figure 3:
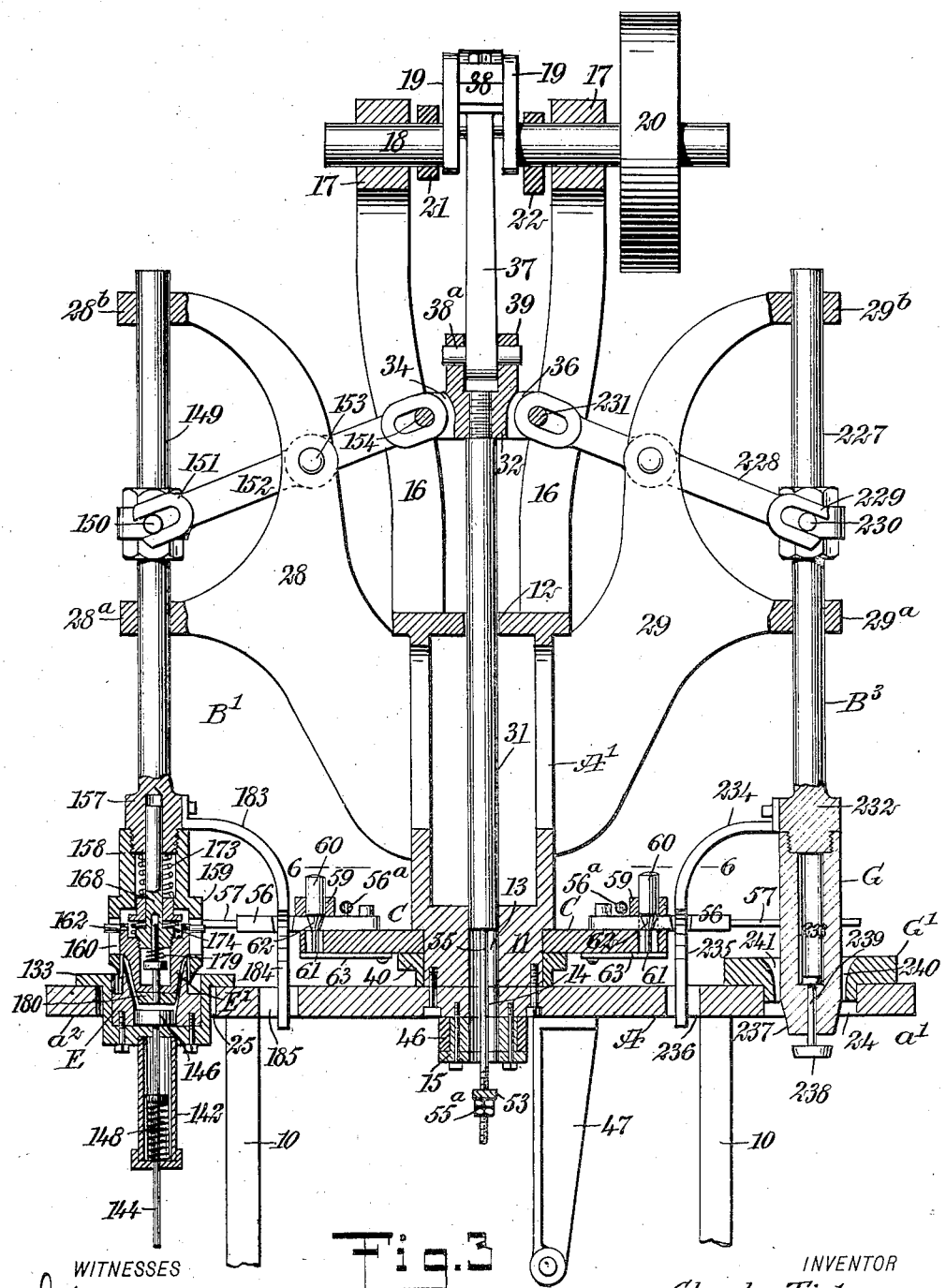
Figure 4:
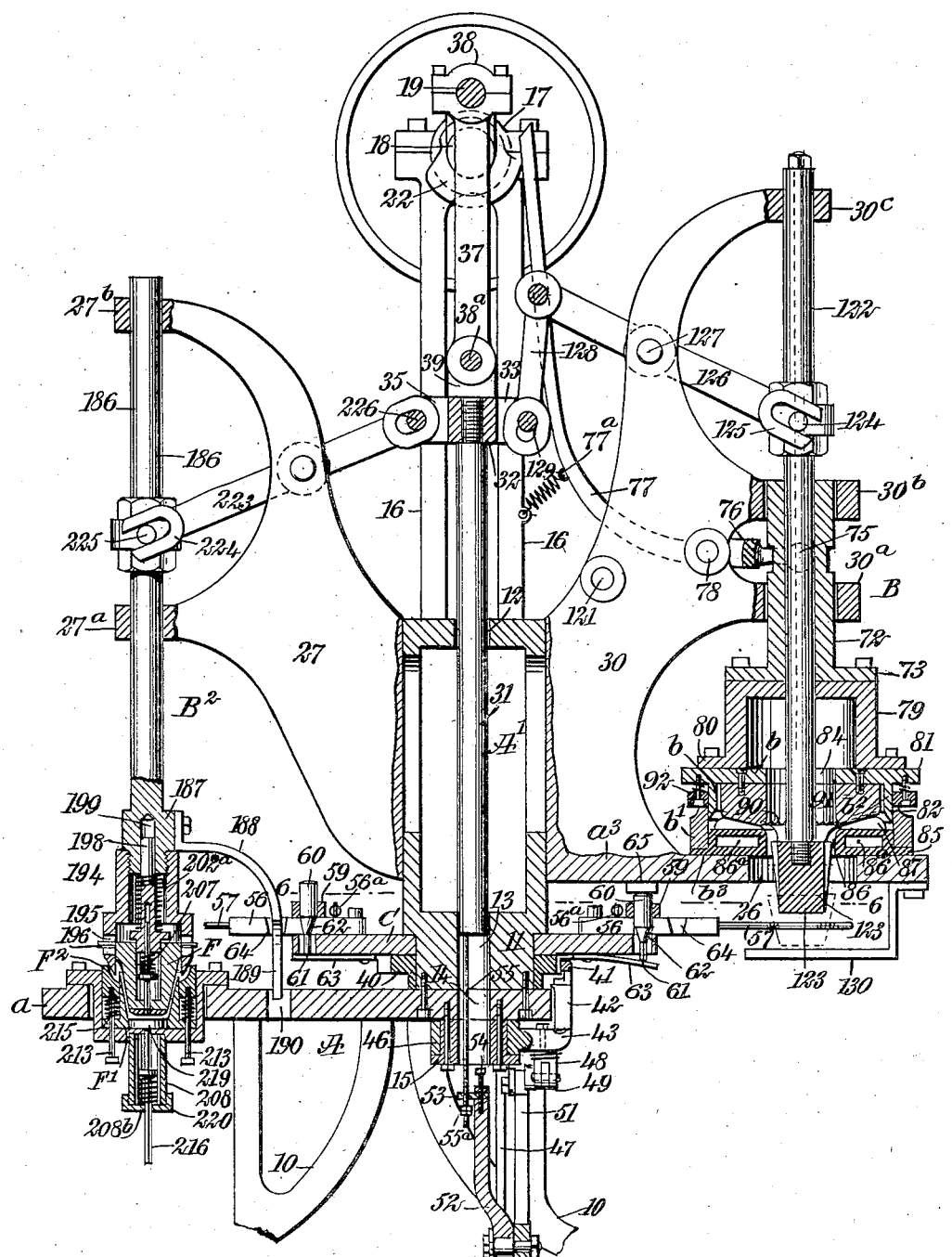

Figure 1 is a front elevation of the machine; Fig. 2 is a side elevation of the machine; Fig. 3 is a vertical section through the machine, the section being taken practically on the line 3—3 of Fig. 6; Fig. 4 is a vertical section through the machine, the section being taken at right angles to the section shown in Fig. 3, and practically on the line 4—4 of Fig. 6; Fig. 5 is a plan view of the machine; Fig. 6 is a horizontal section taken substantially on the line 6—6 in Figs. 3 and 4; Fig. 7 is an enlarged vertical section through that portion of t' e mechanism carrying the blank-cutter and shaping dies, the die being shown separated and the cutter in an upper position, the paper being shown as drawn between the male and female members of the dies and the cutters, the shaping piston being elevated; Fig. 8 is a section through the dies and the cutters, and the piston, but showing the blank as cut and as being corrugated by the dies, and the piston in the act of shaping a cup; Fig. 9 is a section taken practically on the line 9—9 of Fig. 8; Fig. 10 is a plan view of a portion of the lower die for corrugating the blank; Fig. 11 is a side elevation of a cup as delivered from the mechanism shown in Figs. 7 and 8; Fig. 12 is a vertical section through the mechanism for producing the first turn of the flange at the edge of the cup, the parts of the mechanism being in position for action upon the cup; Fig. 13 is a sectional side elevation of the mechanism shown in Fig. 12, showing the parts in action, which mechanism in addition to making the first turn or fold for the flange of the cup also slants all the corrugations in the same direction; Fig. 14 is a diagrammatic sectional view through a cup having the first turn or fold of the flange formed thereon; and Fig. 15 is an enlarged plan view of the cup, showing the inclination of the corrugations prior to the formation of the first fold for the flange; Fig. 16 is a vertical section through the mechanism for making the second turn or fold on the flange, the parts being shown in position for action; Fig. 17 is a sectional side elevation of the mechanism shown in Fig. 16, showing the parts in action; Fig. 18 is a diagrammatic sectional view through the cup, illustrating the complete flange formed thereon by the mechanism shown in Figs. 16 and 17; Fig. 19 is a diagrammatic sectional view through a cup having the complete flange formed thereon, and also showing the flange flattened or clenched by the delivery mechanism of the machine; and Fig. 20 is a detail sectional view of a stop device for the rotating table of the machine.

The bed or table A of the machine is shown best in Fig. 6, wherein it will be observed it consists of a central portion from which three horizontal sections project, one section $a$ projecting to the rear, another section $a'$ to the right and the third section $a^2$ to the left. On the central portion of this table a standard A' is bolted or otherwise firmly secured, said standard having a hollow rectangular upper portion 10 and a lower circular portion 11, as is shown in Figs. 3 and 4. An opening 12 is made in the central portion of the said standard at the top, and a corresponding opening 13 is made in the circular lower portion of the said standard, while a registering opening is made in the central portion of the said table, which latter opening 14 registers with the bore of a flanged sleeve 15 that is securely belted to the under face of the table, as is also shown in Figs. 3 and 4. The table A is completed by the addition of a forwardly-extending horizontal member $a^3$ which is secured to the front face of the standard A' and is at a greater elevation than the main portion of the said table A, as is clearly shown in Fig. 4. Sets of upwardly-extending standards 16 are secured to the side portions of the standard A' at the top, and the standards of each set are connected at their upper ends by bearing boxes 17, in which boxes the drive shaft 18 is mounted to turn. This drive shaft is preferably constructed in two sections as shown, each section being provided with a crank arm 19 to be connected in a manner to be hereinafter described, and a driving pulley 20 is secured to one outer end portion of the said shaft.

At the left-hand portion of the shaft 18 a cam 21 is secured, which cam is adapted to control the feed of paper from which the blank is to be cut, while at the right hand portion of the said shaft 18 a second cam 22 is located, which cam controls the movement of the mechanism for cutting out the blank and the dies for printing or corrugating the blank. The cam 21 is of the elliptical order as is best shown in Fig. 2, while the cam 22 is of the segmental type as is illustrated in Fig. 4; and the operative positions of the two cams with reference to each other is best shown in the said Fig. 2. An opening 23 is made in the rear extension member $a$ from the table A, a similar opening 24 is made in the member $a'$ and a like opening 25 is produced in the member $a^2$, while a similar opening 26 is produced in the member $a^3$. Thus the openings are near the outer ends of said members.

Four independent mechanisms are employed in the construction of a cup, all of which are operated from a common driving mechanism, and means are provided to be hereinafter described, for carrying the blank from one of said mechanisms to another. For example, a mechanism B is located over the opening 26 in the table extension $a^3$, as is shown in Fig. 4, which mechanism is adapted to cut a blank from a continuous sheet of paper, to crimp or corrugate the blank and to press said blank into approximately the proper shape for a cup. A mechanism B' which is located over the opening in the table extension $a^2$ is that which produces the initial fold at the rim of the cup; a mechanism $B^2$ which is located over the opening in the rear extension $a$ of the table A is that which imparts the second or inner fold to the flange section of the cup, while a mechanism $B^3$ shown in Fig. 1 and which is located over the opening in the table extension $a'$, is that which completes the formation of the flange and delivers the completed cup from the machine. Each of said mechanisms is independently supported preferably through the medium of brackets, all of which brackets are secured to the standard A', the front bracket 30 being that which supports the mechanism B, and this bracket is provided with three bearings one above the other, shown in Fig. 4 and designated as $30^a$, $30^b$ and $30^c$. The bracket 28 for the mechanism B' is secured to the left-hand side of the standard A' and is provided with but two bearing points, one above the other and designated as $28^a$ and $28^b$ as is shown in Fig. 3. The mechanism $B^2$ is supported by a bracket 27, which is secured to the rear face of the standard A' and is provided also with two bearings $27^a$ and $27^b$ one above the other, while the mechanism $B^3$ is supported by a bracket 29 secured to the right-hand side of the standard A', said bracket being also provided with two bearings $29^a$ and $29^b$ one above the other.

A piston 31 is mounted to slide in the standard A' and to pass down through the opening in its circular portion 11 as is shown in Figs. 3 and 4; and said piston is provided at its upper end without the said standard A' with a cross head 32 having four arms extending out therefrom, the arm 33 being adapted for operative connection with the mechanism B, the arm 34 with the mechanism B', while the arm 35 is adapted for connection with the mechanism $B^2$, and the arm 36 is connected with the mechanism $B^3$. The head 38 of the pitman 37 connects the crank arms 19 of the drive shaft 18, and the lower end of the said pitman is provided with a pivotal connection $38^a$ to a bifurcated upper portion 39 of the said cross head as is illustrated particularly in Figs. 3 and 4.

A revolving table C is used in connection with the stationary table A heretofore described, the revolving table being of a spider-like construction as shown in Fig. 6, comprising a central portion which turns around the circular lower part of the standard A', and as illustrated in Fig. 6, four arms extend out from the center, an arm $c$, a second arm $c'$, a third arm $c^2$ and a fourth arm $c^3$, each of which arms is adapted to carry a clamp to receive a cup and carry the same as the table C revolves, and means also to be described for releasing the cup at the proper time.

A ratchet wheel 40 also surrounds the circular base of the standard A', and the said ratchet wheel is secured in any approved manner to the under face of the revolving table C. This ratchet wheel 40 is engaged by a dog 41, held in engagement with the teeth of the ratchet wheel by a suitable spring 41ª. The dog 41 is carried by a vertical extension 42 from a horizontal arm 43, and the said extension 42 from said arm 43 is given movement to the extent of a quarter of a circle by a mechanism to be shortly described, moving from a depression 44 to the right of the forward center of the fixed table A to a depression 45 to the left of said center; and the extent of the throw of the dog is such that at each throwing movement the dog will turn the revolving table C just sufficiently to change the position of the arms of the said revolving table from one mechanism to another; that is to say, if the position of the revolving table is such that the arm $c$ is beneath the mechanism B, when said revolving table is moved by the dog the said arm $c$ will be carried from the mechanism B to the mechanism B' where the cup carried by that arm is to be next operated upon, and the positions of the other arms of the revolving table C are correspondingly changed. The carrying arm 43 for the dog 41 is preferably made integral with or is attached to a sleeve 46 that turns around the fixed sleeve 15, being supported by the flange of said sleeve as is shown in Figs. 3 and 4.

The dog 41 is actuated in the following manner: A bracket 47 extends down from the bed or table A and a pin 48 is passed up through the arm 43 carrying said dog 41, while beneath the said dog a horizontal arm 49 is pivoted to the said pin, adapted to rock upward and downward. Upon this arm 49 a second arm 50 is pivotally mounted, adapted to swing thereon horizontally. This latter arm 50 is pivotally attached to the upper and longer member of the elbow lever 51, which elbow lever at the junction of its members is pivoted upon the lower end of the bracket 47, and the lower and shorter member of the said elbow lever 51 extends in direction of the central portion of said table, or that portion through which the piston 31 passes, as is best shown in Fig. 1. An upwardly-extending arm 52 is pivoted to the lower end of the elbow lever 51, and at the upper end of this arm 52 a head 53 is formed, while at its extreme upper end a set screw 54 is provided, which set screw is engaged by the lower end of the piston 31 when said piston reaches its lowest point. A rod 55 is secured to the lower end of the piston 31, which rod extends down through the sleeve 15 to a point below the same and through an aperture in the head 53 of the arm 52. The lower end of said rod 55 is threaded and receives nuts 55ª. As the piston descends and strikes the set screw 54 it operates the links and levers just described in a manner to throw the dog 41 in a direction to turn the ratchet wheel 40 the desired distance; and upon the upward stroke of the piston 31 the nuts 55ª coming in engagement with the head 53 of the pivoted arm 52 will throw the dog 41 in a reverse direction or carry it to its normal position ready for action.

It will be observed that by the adjustment of the set screw 54 on the arm 52, the dog 41 can be moved a greater or a less distance to cause the rotating table to travel a greater or a lesser distance at each operation of the dog; and that by adjusting the nuts 55ª the rearward or return movement of the dog 41 can be controlled, so that the revolving table C can be made to move slowly or rapidly as may be desired.

Each projecting member $c$, $c'$, $c^2$ and $c^3$ of the revolving table C is provided with a gripper D, all of said grippers being of the same construction. A gripper D consists of opposing body bars 56, which are pivoted at their inner ends upon the upper face of an arm of the said rotating table, and the two body bars are normally drawn close together by means of a suitable spring 56ª. A jaw 57 is carried by the outer end of each of the body bars 56, being removably secured therein by set screws 58 or their equivalents, and said jaws are suitably shaped to hold a cup between them.

A bridge bar 59 is made to cross the body bars 56, which bridge bar is of sufficient length to permit the necessary separation of the body bars to enable the jaws 57, when desired, to drop the cup held thereby. The bridge bar is provided with a pin 60, having sliding movement in opposing conical grooves in the inner faces of the body bars 56 as is shown in Fig. 4; and said pin 60 is provided with a pointed lower end and a conical section 62 between the body of the pin, which is cylindrical, and its lower pointed end 61 as is also shown in Fig. 4, and when the body of the pin is pressed downward it causes the separation of the free ends of the body bars 56 and consequently the separation of the jaws 57, and when the pin 60 is so pressed it engages with a spring 63 which is secured to the under face of the arm carrying the grippers as is shown to the right in Fig. 4, which spring serves to force the pin upward to normal position when relieved from downward pressure, permitting the spring 56ª at such time to act to close the jaws. The pins 60 of the grippers D are pressed down only when they pass one portion of the machine; that is, when they pass beneath the upper fixed table member $a^3$, as is also shown in Fig. 4, at which time the pin is pressed downward by a block 65 having one of its ends tapering, said block being secured to the under face of the said table member $a^3$, and when this engagement takes place the jaws of the gripper acted upon will be immediately below the opening 26 at which the initial operation performed by the mechanism B takes place.

Forward of the openings through which the pins 60 of the grippers' pass, opposing tapering openings 64 are likewise produced in the inner faces of the body bars 56 of the grippers as is shown in Figs. 4 and 6; and these latter recesses 64 are for the purpose to be hereinafter described.

It is desirable to provide a stop for the revoluble table after it has been moved a portion of a revolution by the dog 41. This is accomplished by the devices particularly shown in Figs. 2, 6 and 20, wherein blocks 66 having a tapering end 67 facing the direction of rotation of said revolving table C, are secured by bolts $67^a$, or their equivalents, to the under face of the ratchet wheel 40 at points between its teeth, and in locating a pin 68 in the stationary table A at a point to the left of its center near its rear edge, as is indicated in Fig. 1. This pin 68 has vertical sliding movement in a suitable opening in the stationary table A, and is provided at its upper end with a head 69, tapered to meet the taper 67 of a stop block 66, and the head 69 of the pin 68 is normally held below the upper face of the said stationary table by means of a spring 70, as is shown in Fig. 20. The lower end 71 of the locking pin 68 is rounded off and extends some distance below the under face of the said table A. Thus, in operation, as the dog 41 is moved in a direction to cause the table C to rotate, the supporting arm 43 of the dog 41, as said dog approaches the limit of its driving movement, will engage with the lower end 71 of the pin 68 and will force the said pin upward, bringing the inclined surface of its head 69 against the inclined end 67 of the nearest block 66 on the ratchet wheel 40, thus effectually preventing the ratchet wheel from turning further in the direction in which it was carried. Upon the return movement of the dog 41 its carrying arm 43 releases the locking pin 68 and permits the spring 70 to act to restore it to normal position.

With reference to the mechanism B located over the table member $a^3$ and adapted to cut and shape a blank for a cup, a cylinder 72 is mounted to slide in the bearings $30^a$ and $30^b$ of the bracket 30, which cylinder is provided at its lower end with a flange 73, to which the upper portion of a casing 79 is secured, said casing being open at the bottom and provided at said bottom edge with a flange 80. The casing is provided at its top with an opening registering with the bore of the cylinder 72, but the casing and cylinder may be made in one piece if desired. The casing 79 supports a male cutting die $b$, the back or upper portion 81 whereof is secured to the flange 80 of the casing 79; and the cutting section 82 of the said die $b$ extends downward from the back 81. The die is round, as is likewise the casing 79, but it will be understood it can be otherwise shaped if desired.

The male cutting die $b$ operates in conjunction with a female cutting die $b'$, which latter is secured upon a flange 85 formed at the marginal portion of a female shaping die $b^3$, which female shaping die $b^3$ is secured upon the upper face of the table member $a^3$ around the opening 26 therein. Said female shaping die is provided with a central opening 86, which is above the opening 26 but is of much lesser diameter. The opening 86 in the die is surrounded by a chamber $86^a$ through which a heating agent is passed and from which said agent is drawn through the medium of simple conducting pipes 88 and $88^a$ shown in Fig. 10. The upper face of said female shaping die $b^3$ is concaved, the opening 86 being at the center; and the upper face of the said die $b^3$ is provided with series of radial ribs 87, angular in cross section and tapering in direction of the opening 86 where said ribs diminish in width, forming a concaved fluted or corrugated shaping surface for said die $b^3$; and the corrugations or flutes are continued down the wall of the opening 86 in said die in their contracted arrangement as is shown at 89 in Figs. 7, 8 and 10.

The male shaping die $b^2$ is secured to the back of the male cutting die $b$, and is of lesser diameter than the inner diameter of the cutting section 82 of the cutting die, as is clearly shown in Figs. 7 and 8. The bottom surface of the male shaping die $b^2$ is convexed to conform to the concavity of the opposing face of the female shaping die $b^3$; and the said concaved face is provided with ribs or flutes 90, or is corrugated correspondingly to the opposing face of the female die $b^3$, so that when the two dies $b^2$ and $b^3$ are brought together the material between them will be more or less dished, and at the same time will be corrugated around the center; and when the material thus corrugated by the mating faces of the said shaping dies is drawn down through the opening 86 in the female shaping die $b^3$, the said article will be given the form of a cup and will have sides perfectly corrugated by being drawn in contact with the corrugations or flutes in the wall of said opening 86. The male shaping die $b^2$ is provided with a central opening 91, larger than the opening 86 in the female shaping die; and the opening 91 in the male shaping die registers with the opening 84 in the back 81 of the male cutting die $b$.

In the operation of cutting a blank, the male cutting die $b$ passes down in engagement with the inner face of the female cutting die $b'$, as is clearly shown in Fig. 8. The strip of paper 95 from which the blank is to be cut and shaped is a wide strip; consequently when said blank is cut there is a liability of the wall of the opening in the paper produced by the departure of the blank, adhering to the exterior of the male cutting die when said die is restored to its upper or normal position. I therefore employ a stripper 92, which is in the form of a ring having a groove in its under face, the said ring being in sliding engagement with the exterior of the cutting section or member 92 of the said male cutting die. This ring is slidable on pins 93 that are secured in an annular extension from the back portion 81 of the said male cutting die, as is shown in both Figs. 7 and 8; and springs 94 are coiled around these pins, bearing against said extension and against the said ring. Thus in operation, when the male cutting die is forced downward to cut the blank as is shown in Fig. 8, the stripping ring 92 will engage with the sheet of paper from which the blank was removed and will hold the paper against the upper edge of the female cutting die $b'$, as is illustrated in Fig. 2, and when the male cutting die is raised the springs 94 act to force said stripping ring 92 down to its normal position flush with the cutting edge of the male cutting die, as is shown in Fig. 7, effectually removing all tendency of the sheet of paper sticking to the dies and enabling the paper to be freely fed along for another cut. The sheet of paper 95 is carried between feed rollers 96 and 97, journaled in upward extensions 98 from the frame bars 99, which extend transversely of the table member $a^3$, the rollers being at the left-hand side of the said table member, as is shown in Fig. 1. At the right-hand end of the frame bars 99 a tank 100 is formed, open at the top, which tank is adapted to contain water as is shown in Fig. 7; and arms 101 extend upward and outward from the sides of the said tank, between which arms a reel of paper 102 is mounted to revolve, engaged by a counterbalance smoothing device 103 pivoted between the arms 101. The paper 95 is carried from the roll 102 over the guide roller 104 in the arms 102, and then over a moistening wheel 105, mounted to revolve in the tank 100, the periphery of which wheel is covered by an absorbent material 106 as shown in Fig. 7 and enters the water in the tank, as is illustrated in the same figure. The paper upon leaving the moistening wheel 105 is passed over a guide roller 107 to the left of the wheel, and then between the male and female dies described, out between the feed rollers 96 and 97.

The feed for the paper is as follows: In an extension 108 for the left-hand support for the feed rollers, as is shown in Fig. 2, a shaft 109 is mounted to turn, carrying a large gear 110 and a smaller gear 111. The large gear 110 meshes with a pinion 112 on the trunnion of the upper feed roller 97, and said pinion 112 meshes with a similar pinion 113 on the trunnion of the lower feed roller 96. The smaller gear 109, the two gears 109 and 110 turning together, meshes with a large gear 114 on a shaft 115 above the shaft 109; and said large gear 114 has an attached ratchet wheel 116, which is engaged by a dog 117 carried by an arm 118 mounted to turn at the outer end of the shaft 114, the dog engaging with the ratchet wheel 116. Said arm 118 carrying the dog 117 is preferably made in adjustable sections, and its upper end is made to slide in an elongated slot 119 at the end of a lever 120, pivoted near its slotted end by a suitable stud 121 to the bracket 30 for the mechanism B, and said lever 120 is carried upward to an engagement with the cam 21 on the drive shaft 18, which cam in operating the lever 120 causes the paper to be fed between the dies at the down-stroke of the piston 31, since during that time the dies are separated. The arm carrying the dog 117 is made in two sections in order that it may be adjusted to or from the inner or outer end of the slot 119 in the lever 120 so as to make the feed rapid or slow, as desired. A plunger 122 is held to slide in the upper bearing $30^c$ of the bracket 30 and down through the cylinder 72 and through the openings in the dies. Said plunger is provided at its lower end with a tapering head 123, fluted or corrugated to correspond to the corrugations or flutes in the wall of the opening 86 of the female shaping die, at which opening the said head passes with but little play. The upper end portion of the plunger 122 is provided with oppositely-extending pins 124, which receive the forked members 125 at the bifurcated outer end of link 126, which link is fulcrumed between its ends to the bracket 30; and the link 126 at its inner end is pivotally attached to an upwardly-extending link 128, which in its turn is pivotally connected with a pin 129 between the ears 33 extending forward from the cross head 32 of the piston 31, as is also shown in Fig. 4. Thus it will be observed that the dies are operated by the cam 22 and the lever 77, which lever, by the way, is held in normal position by a spring $77^a$, while the plunger receives its motion from the movement of the piston 31. In the operation of this portion of the device, which is the initial operation, a gripper D being below the table member $a^3$ with its jaws open, let it be supposed that the paper 95 has been fed between the dies while they were separated and at the down-stroke of the piston 31. On the up-stroke of the piston, the rise of the cam 22 acts upon the lever 77, causing the said lever to carry down the cylinder 72 and the male cutting and shaping dies carried thereby, pressing said dies upon the paper and bringing the male cutting die in operative relation to the female cutting die, and the male shaping die in corresponding relation to the female shaping die. The result will be as is shown in Fig. 8 that a dished blank 131 is formed, corrugated from a point adjacent to its center to its margin. While the male and female sections of the dies are still in operative position, the plunger 122 travels down, and its head 123 engaging with the center of the blank 131 draws the marginal portions of the blank from between the male and female shaping dies and carries the said blank down through the opening 86 in the female shaping die, forcing the blank in engagement with the corrugations 99 in the wall of said opening; and as the plunger head passes down through the opening 86 in the table member $a^3$, it drops a shaped cup 132, shown in Fig. 1, between the jaws of the waiting gripper and upon a platform 130, as is shown by dotted lines in Fig. 4. The cup thus formed is practically stripped from the head 123 of the plunger 122 by reason of the sharp lower edge of the central opening in the female shaping die engaging the upper edge of the cup as the head of the plunger ascends, causing the cup to leave the plunger, since particularly when the cup reaches the larger opening 26 in the table member $a^3$ it naturally expands at its upper edge. The upward movement of the plunger 122 and the accompanying opening movement of the dies are accomplished on the up-stroke of the piston 31, and as stated, the feed of the paper is brought about on the down-stroke of the said plunger, and upon said down stroke of the plunger the table C is turned, the grippers which were under the table member $a^3$ close around the cup as they leave said table member, and said grippers carrying the said initially-formed cup pass to the left-hand table extension $a^2$ and stop beneath the mechanism B' for the purpose of having the flange partially formed at its upper edge.
With reference to the mechanism B' a casing 133 is passed down through the opening 25 in the left-hand projecting member $a^2$ of the stationary table A, the said casing being held in place by bolts 134 or their equivalents. A turning die E is fitted in said casing 133, being held stationarily therein by bolts or similar devices as is shown in Figs. 12 and 13. This turning die E comprises a body portion 135, which fits snugly to the interior of said casing 133, and an upper section 136 which is reduced in diameter, since said die E is circular. Said die is provided with a shaping chamber 137 which is tapering, being inclined from the top downward in direction of the center, the lower tapering portion of which chamber is provided with corrugations or flutes 138, as shown in Fig. 12. The bottom portion, however, of the said chamber 137 is cylindrical, being of the same diameter as the diameter of the lowermost tapering portion of the chamber as is shown at 139 in Fig. 12. The upper edge of the extension portion 136 of the die E is more or less sharp as is shown at 140 in Fig. 12, and a space 141 intervenes between the inner wall of the casing 133 and the outer wall of the upper section 136 of the turning die E.

A cylinder 142 is secured to the central bottom portion of the casing 133, preferably in a detachable manner, and said cylinder 142 at its bottom is provided with a cap 143 screwed thereon, or otherwise removably connected. A rod 144, acting in the manner of a piston, is passed up through the cap 143 through the cylinder 142, through the bottom of the casing 133 and up through the chamber 137 in the turning die E, the opening in the casing 133 being designated in Fig. 12 as 145. Normally the upper end of the piston rod 144 is at the upper portion of the top of the turning die E, and at said upper portion a disk 146 is secured to the rod 144, said disk 146 having its upper face normally in horizontal alinement with the upper edge of the aforesaid turning die E as is also shown in Fig. 12. A collar 147 is secured to the rod 144 within the cylinder 142 at the upper end of the latter, and a spring 148 is coiled around said rod 144, having bearing against the said collar 147 and the cap 143 as is shown in Figs. 12 and 13. The above-named parts are the stationary portions of the aforesaid mechanism B', and the die E is a female die.

The parts that operate in connection with the parts just above described are as follows: A plunger 149 is mounted for action in the bearings $28^a$ and $28^b$ of the bracket 28 as is shown in Fig. 3. This plunger is provided with opposing pins 150, which receive the bifurcated members 151 at the outer end of a link 152, which is pivoted by a suitable pin 153 to the upper portion of the bracket 28; and the inner end of the link 152 is pivotally connected with a bar 154 that connects the left-hand ears 34 from the cross head 32, as is shown in Fig. 3. The lower end 157 of the plunger 149 is enlarged, and has a lower reduced portion exteriorly threaded, to which reduced threaded portion of the plunger head the shank 158 of a cylinder head 159 is secured by being screwed thereon; but other means may be adapted to the same end. The cylinder head 159 is provided with two or more preferably four slots 160. These slots are vertically disposed and are angular in formation, comprising as is best shown in Fig. 13, a lower diagonal section $d$ and an upper straight section $d'$. The lower edge of the said cylindrical head 159 is beveled downward and inward as shown at 161 in Figs. 12 and 13. A male turning die E' is mounted to slide in the cylindrical head 159, which die within the said head is provided with horizontal pin projections 162 that extend out through the aforesaid slots 160, as is also best shown in Figs. 12 and 13, the said pins when traveling up the diagonal or inclined portions $d$, turn the male turning die E' a portion of a revolution; but when the pins 162 reach the straight portions $d'$ of the slots 160, said male turning die E' remains stationary within the cylindrical casing 159 as far as rotary motion is concerned.

The lower end 163 of the male turning die E' is tapering as is shown in Fig. 12, and said tapering portion of the die is provided with ratchet teeth 164, but above the ratchet teeth 164 the exterior surface of the male turning die E' is concaved as shown at 165 in Figs. 12 and 13. Above the concave 165 said male turning die E' is exteriorly straight as is shown at 166 in Fig. 12. At the lower portion of the male turning die E' a chamber 167 is produced, which does not extend through the bottom portion of the die but does extend through its upper portion; and in the upper portion of this chamber the lower end or head 168 of a rod or plunger 169 is screwed or otherwise removably fastened. The upper end of said rod or plunger 169 has vertical movement in a chamber 170 made in the head 157 of the plunger proper 149 as is shown in Fig. 12. A chamber 171 is likewise made in the head 168 of the plunger rod 169 as is also shown in Fig. 12; and a collar 172 is loosely mounted on said plunger rod 169 within the cylindrical head 159, and a spring 173 coiled around the plunger rod 169 has bearing upon said collar 172 and against the lower head section 157 of the plunger proper 149. A second spring 174 is likewise coiled around the plunger rod 169 and its head section 168, and this latter spring 174 has engagement with the under surface of the collar 172 and against the bottom wall of a recess 175 made in the upper portion of the male turning die E' as is shown in Fig. 12.

A follower rod 176 is passed through the male turning die E' from the bottom and extends through the chamber 165 therein and up into the chamber 171 in the head 168 of the plunger rod 169. A collar 178 is secured upon the plunger rod 176 within the chamber 167, and a spring 179 is coiled around the plunger rod 176, bearing against the said collar and the upper wall of the chamber 165. The spring 179 is of greater strength than the spring 148 in the cylinder 142 of the stationary portion of this mechanism B'. The spring 174 is of lesser strength than the spring 179 but of greater strength than the spring 148 in the cylinder 142; but the spring 173 in the shank section 158 of the cylindrical head 159 is of much greater strength than any of the other springs enumerated.

At the lower end of the follower rod 176 a tapering cylindrical disk 180 is secured in any approved manner, being normally held below the lower end 163 of the male turning die E' by the action of the spring 179. A releasing arm 183 is attached to the inner face of the lower head section 157 of the plunger proper 149 of the said mechanism B', which arm is curved downwardly from the said plunger proper, and at its lower portion is straight and tapering as is shown at 184. The tapering portion of this releasing arm 183 is adapted to enter the recesses 61 in the members of a gripper D prior to the male turning die E' engaging with the female turning die E, and an opening 185 is provided in the extension member $a^2$ of the stationary table A for the downward passage of said releasing arm 183, as is shown in Fig. 3.

It will be remembered that the blank was cut, corrugated and shaped by the mechanism B and was delivered to the gripper D, which gripper was made to travel to a position between the upper and lower portions of the mechanism B' for the purpose of producing a flange on the upper edge of the cup. In the latter stage the gripper referred to occupies the position shown in Fig. 12 between the upper and lower sections of the turning mechanism B'. It may be here stated that in order to turn a flange on a corrugated surface it is necessary in order to obtain a compact fold, to give the corrugations a slant in one direction where the fold is to be made, as is shown at $E^2$ in Fig. 15. This is one of the objects of said mechanism B' just described.

In the detail operation of the mechanism B' the disk 180 on the follower rod 176, as the plunger proper 149 descends, enters the cup 132 in the jaws of the gripper D and passes to the bottom of said cup, carrying it down to an engagement with the disk head 146 on the spring-controlled rod 144. As the plunger proper 149 continues to further descend, the tapering portion 184 of the releasing arm 183 entering between the members of the gripper D separates its jaws, permitting the disk 180 to carry the cup 132 down to a firm engagement with a head 146; and in the further continued downward movement of the plunger proper 149 the head 146 receiving the cup is depressed, owing to the superior strength of the spring 179 over that of the spring 148. When the cup has been pressed down almost as far as possible, the spring 174 commences to act, and the pins 162 will then pass up the diagonal portions $d$ of the slots 160 in the cylinder head 159 and will cause the male turning die E' to slightly turn a sufficient distance to give a pitch in one direction to all of the ribs of the corrugated surface of the cup, which pitch is indicated by $E^2$ in Fig. 15. As the plunger proper 149 further descends, the concaved portion 165 of the male turning die E' striking the upper edge of the cup, as is shown in Fig. 13, curves said edge to an extent in an outward direction as is shown at 181 in Fig. 13. The springs 148, 179 and 174 will now be practically compressed to their full measure and the more powerful spring 173 only will remain in action. As this spring is compressed by the further downward movement of the plunger proper 149, the lower edge of the inclined portion 166 of the cylinder head, which will continue downward after the die E' has ceased its motion, will engage with the out-turned portion of the cup and will turn the top edge over and downward, producing a single flange 182, shown in Fig. 14.

With reference to the mechanism B² adapted to form the second turn of the flange at the mouth of the cup and which mechanism is located over the fixed table extension $a$ a plunger 186 is employed, which is mounted for movement in the bearings 27ª and 27ᵇ of the bracket 27 as is shown in Fig. 4; and as is also particularly shown in the said figure, the plunger is provided with a head 187 from which a downwardly-curved spacing arm 188 is carried, the lower portion 189 whereof is beveled; and said spacing arm when the plunger 186 is down extends into an opening 190 in the aforesaid fixed table extension $a$. The spacing arm 188 corresponds to the arm 183 employed in the mechanism B' for making the first turn in the said flange. The plunger 186 is given movement through the medium of a link 223 having a bifurcated forked outer end 224 that engages with pins 225 extending from the opposite side of the flange, as is also shown in Fig. 4; and the inner end of the link 223 is pivotally connected by a pin 226 with the rearwardly-extending ears 35 from the cross head 32. The detail construction of the said mechanism B² is best shown in Figs. 16 and 17. The plunger head 187 is screwed into the tubular cylindrical body 191 of a cylindrical head 192 whose outer surface 193 at its lower edge is beveled downward and inward and its lower edge 194 is straight or flat. The cylindrical head 192 is provided with two or more vertical slots 195, and within the said head 192 a male turning die F is mounted to slide, which die conforms to the interior contour of the cup on which the flange is to be turned. This male turning die F is provided at its upper portion with pins 196 that extend out through the slots 195 in the head, permitting the said male die F to have vertical movement in the head, but holding it against rotary movement. A central vertical chamber 197 is provided in the said die F, and a rod 198 is mounted for sliding movement at its upper end in the head 199 of the plunger 186, as is shown in Fig. 16, the lower end 200 of the said rod being enlarged, threaded and screwed into the upper end portion of the die chamber 197; and in the lower end of the sliding rod 198, which is a guide rod, a longtitudinal bore 201 is made, also shown in Fig. 16, which bore receives the upper end of a second rod 203, which is likewise a guide rod; and the said guide rod 203 extends up through the bottom of the die F, passing through its chamber 197.

At the lower end of the outwardly-extending rod 203 a disk 204 is secured, adapted to enter and fit the bottom portion of the cup 132; and this disk has a ring projection 205 upon its under face. A collar 206 is secured to the disk-carrying rod 203, being located at the bottom portion of the die chamber 197; and a spring 207 is coiled around the rod 203 within said chamber 197, having bearing against the collar 206 and against the head 200 of the upper guide rod 198, while a spring 202ª, much more powerful than the spring 207 is coiled around the upper guide rod 198, having bearing against the head 187 of the plunger 196 and against the lower end or head 200 of the upper sliding rod 198. Thus as the plunger 186 is forced downward and the die F meets with resistance, the die is pressed down by means of the superior strength of the spring 202ª; and after the die F has gone as far as it can, the head 192 in which the die is mounted will be pressed downward a distance corresponding to the length of the slots 195, placing the main spring 202ª under compression to return the head to its normal position when its services are not needed.

The above constitutes the first portion or section of the mechanism for turning the second fold in the flange. The second section is a stationary section, and in its construction a casing 208, preferably circular, extends down through the opening 23 in the extension $a$ of the stationary table A, being secured to said extension in any suitable or approved manner. A female turning die F', adapted to receive the die F above mentioned is seated in the said casing 208 and is provided with a sharp upper edge 209 and a tapering main chamber 210 which receives the cup to be operated upon. The said die is also provided with a lower chamber 211, circular and of uniform diameter with the bottom of the tapering chamber 210. The female die F' is provided with a bottom flange 212, and rods 213 having heads at their lower ends are loosely passed up through the bottom of the casing 208 and through the flange 212 of the female die F', the upper ends of said rods being secured to the auxiliary female die F²; and the tapering portion 193 of the die-carrying head 192 is practically the male member for the auxiliary die F², entering the same in action as is shown in Fig. 17. This auxiliary die F² is of ring formation, and surrounds the upper sharpened end of the main female die F' and is capable of vertical movement on said main die. The upper surface of the auxiliary die F² is rendered concave, as is shown particularly at 214 in Figs. 16 and 17; and said auxiliary female die F² is held in such manner that the lower or inner edge of its concaved surface 214 is flush with the upper edge of the main female die F' by means of springs 215, which are coiled around the rods 213, having bearing against the bottom of the aforesaid auxiliary female die F² and the flange 212 of the main female die F'.

As shown most clearly in Figs. 16 and 17, a second casing 208ª extends down from the central bottom portion of the main casing 208, being closed at its bottom by a preferably detachable cap 208ᵇ. A rod 216 extends loosely through the lower casing 208ª and through the upper casing 208 and likewise through the chambers of the female die F', occupying a central position therein, and within the upper portion of the lower casing 208ª a collar 217 is secured to said rod, while at the upper end of the sliding rod 216 a disk 218 is secured, against which the bottom of the cup is made to bear during the operation of forming the flange thereon. This disk 218 is provided with an annular groove 219 in its upper face, corresponding to the annular flange 205 made on the under face of the disk 204; and in the action of these two disks the flange and groove are adapted to register. The disk 218 is held normally with its upper face about flush with the upper edge of the auxiliary female die F² by a spring 220, which spring is contained within the lower casing 208ª, having bearing against its cap 208ᵇ and against the said collar 217 as is shown in Fig. 16. The spring 207 in the male die F is of greater strength than the spring 220 controlling the disk 218; but the spring 202ª, which is a main spring as stated, is of greater strength than the spring 207.

In the operation of this mechanism B², when a gripper D has brought a cup in position between the two sections of the mechanism the flange having been partially formed thereon by the mechanism B', as the plunger 186 descends the disk 204 enters the cup while yet in the gripper and by the time that the spacing or separating arm 188 has acted to separate the jaws of the gripper the said disk 204 will be in position to directly guide the bottom of the cup to the under disk 218. As the plunger and die further descend, the disk 218 is forced downward and the male die F then enters the cup which is now in the chamber 210 of the female die, and as soon as the first fold of the flange 182 strikes the curved face 214 of the auxiliary female die F², the action of the descending male die F in forcing the single fold of the flange down the said curved surface of said die F², will cause the said edge to turn under as is shown in Fig. 17. The auxiliary die F² will be moved downward by the pressure of the descending male die F, and by the time that said die has traveled down sufficiently to bring the inturned edge of the first fold of the flange 182 in engagement with the upper sharp edge 109 of the female die F', the spring 220 will have been placed under compression and likewise the spring 207, and the head 192 will then move down placing the spring 202ª under compression, and the bottom flat edge 194 of the said head striking the said inturned flange will turn it further inward and cause it to roll upward, making the inner fold 221 shown in Figs. 18 and 19 and completing practically the formation of the flange, and at such time the parts of the mechanism B² will be in the position shown in Fig. 4. Further in completing the formation of the flange a circular rib 222 is made in the bottom of the cup for the purpose of stiffening and strengthening it as is also shown in Fig. 18. After the cup has been treated as described it is carried to the mechanism B³ above the extension a' of the fixed table A for completion and discharge.

The construction and operation of the mechanism B³ are as follows: A plunger 227 is mounted to slide in the bearings 29ª and 29ᵇ of the bracket 29, as is shown in Fig. 3, and the bifurcated forked end 229 of a link 228 engages pins 230 projecting from opposite sides of said plunger. This link 228 is fulcrumed upon the bracket 29, and its inner end is pivotally connected by a pin 231 with the ears 36 at the right-hand side of the machine, as is also shown in Fig. 3. The plunger 227 is provided with a head 232 at its lower end, which is screwed into the upper end of a preferably hollow closing die G. A supporting or spacing arm 234 for the grippers is carried downward through an opening 236 in the table A in like manner as the other corresponding arms heretofore described, and is provided with a tapering lower end 235. The lower end of the closing die G, which is a male die, is made more or less tapering as is shown at 237 in the said Fig. 3, and a disk 238 adapted to enter the bottom of the cup is loosely supported below the under or working surface of the said male closing die G by means of a rod 239 having vertical sliding movement in the said die and being provided with a head 233 located in the chamber of the said male die G. The female die G' is provided with a central opening 240 and is centrally fitted into the opening 24 in the table extension a'. The opening 240 in the female die at its lower end is of slightly greater diameter than the largest exterior diameter of the male closing die G at its lower portion; and the upper portion 241 of the said opening 240 is outwardly curved so that the said upper portion 241 of the opening 240 is more or less flaring and convexed. In the operation of this portion of the machine, when a cup is placed beneath the closing die G the loosely mounted disk 238, which is a guide disk, enters the said cup; and as the jaws of the grippers D are separated by the action of the releasing or spacing arm 234 the said disk 238 will guide the bottom portion of the cup to the opening 240 in the female die G'. The flaring wall of the upper portion 241 of said opening also serves to guide the cup down to the narrower portion, and at the same time as the male die travels downward irons out or flattens the seam initially, the flattening or ironing process being completed at the lower straight portion of said opening 240; and when the male die G has passed sufficiently through the female die to discharge a cup the cup will have been completed.

The operation of cutting the blanks for the cups, shaping them, producing the flanges thereon and discharging the finished cup is continuous as long as the machine is in action and material is supplied to it.

Having thus described my invention, I claim as new, and desire to secure by Letters Patent,—

1. In machines for the manufacture of receptacles, a main support, shaping dies carried by said main support, said main support having a part constituting a support for a roll of material, mechanism for passing material continuously from said roll to said shaping dies, turning dies carried by said main support and adapted to form a marginal flange upon the receptacles fashioned by said shaping dies, a revoluble carrier serving to present the receptacles successively to said turning dies, means for releasing a receptacle from the carrier at each presentation, and actuating mechanism common to said device.

2. In machines for the manufacture of paper receptacles, a main support, cutting and shaping dies carried by the said main support, a roll of material, an auxiliary support for the said roll of material carried by the main support, an automatic feed mechanism that passes the material from said roll between the male and female members of said dies, a series of turning dies likewise carried by the main support adapted to form a marginal flange on the material, a revolving carrier, grippers located upon said carriers, means for releasing the grippers carried by the die mechanisms, said carrier being adapted to present material consecutively to the various co-acting dies, a stop mechanism for the carrier, and an actuating mechanism common to the dies and the said carrier.

3. In machines for manufacturing paper receptacles, a main support, means for revolubly supporting a roll of material, an automatical feed mechanism for the said material, a cutting and shaping mechanism carried by the main support adapted to act upon the said material, which mechanism includes cutting and shaping dies, flanging mechanisms for the material also carried by said support, each including turning dies of a different character, a revolving carrier, grippers for the material located upon the carrier and adapted to register with the lower portions of said mechanisms, releasing devices provided for each of said mechanisms adapted to act upon the said grippers, and an actuating mechanism common to the cutting and shaping, and the flanging mechanism, and also the carrier.

4. In a machine for manufacturing paper receptacles, a support, a cutting and shaping mechanism carried by the support, means for continuously supplying material to said mechanism, which mechanism includes male and female cutting dies and male and female corrugating and drawing dies, flanging mechanisms for the receptacles likewise carried by the support, including male and female turning dies of different character, a revolving table, grippers for the receptacles carried by the table, releasing devices for said grippers carried by each of said mechanisms, and an actuating means common to all of said mechanisms and to the said table.

5. In a machine for manufacturing paper receptacles, a support, a cutting and shaping mechanism carried by the support, means for continuously supplying material to said mechanism, which mechanism includes male and female cutting dies, and male and female corrugating and drawing dies, flanging mechanisms for the material, likewise carried by the said support including male and female turning dies of different character, a revolving table, grippers for the material carried by the table, releasing devices for the grippers carried by each of said mechanisms, an actuating means common to all of said mechanisms and to said table, controlling devices for the actuating means, and a stop device for said table.

6. In a machine for manufacturing paper receptacles, a support, a mechanism carried by the said support including cutting dies, corrugating, shaping, and drawing dies, means for a continuous feed of material to said dies, which means is carried by said support, flanging mechanisms likewise carried by said support, including turning dies of different shapes, a revolving table also carried by said support, grippers for the receptacles secured to the said table, releasing devices for the grippers carried by each of said mechanisms except the mechanism for feeding material, a stop device for the table, and an actuating mechanism common to all of said mechanisms and to said table and feed mechanism.

7. In a machine for manufacturing paper receptacles, a support, a mechanism carried by said support including cutting dies, corrugating, shaping, and drawing dies, means for the continuous feed of material to said dies, which means are carried by the said support, flanging mechanisms likewise carried by the said support including turning dies of different shapes, a revolving table also carried by said support, grippers for the material secured to said table, releasing devices for the grippers carried by each of said mechanisms except the feed mechanism for primarily supplying the material, a stop device for the table, an actuating mechanism common to all of said mechanisms and to said table, and feed mechanism, means for controlling the mechanism for primarily supplying material, and means for controlling the movement of the table.

8. In a machine for making paper receptacles, a support, a mechanism carried by said support, including cutting dies and combined shaping and drawing dies, the latter dies having corrugated faces for engagement with material supplied to them, a feed mechanism for passing material between the said dies, flanging mechanisms also carried by the said support, each of said mechanisms including male and female turning dies of different character, the turning die of one of the said mechanisms being adapted for rotary and vertical movement and the other dies of said mechanisms having vertical movement only, a revolving table, grippers carried by the table, means carried by said mechanisms for opening said grippers, and an actuating mechanism common to the cutting and shaping mechanism the flanging mechanisms the feed mechanism and the table.

9. In a machine for manufacturing paper receptacles, a support, a cutting and shaping mechanism carried by said support, including male and female cutting dies and male and female corrugated shaping dies, the female shaping die being provided with a corrugated opening therein, and a corrugated plunger adapted to pass through all of the dies and the opening in the female shaping die, flanging mechanisms comprising coöperating male and female turning dies, a male turning die of one mechanism being adapted for rotary and vertical movement and the other male dies of said flanging mechanisms having vertical movement only, a revolving table carried by the support, spring-controlled grippers carried by the table, adapted to receive receptacles and convey them from one mechanism to another, a stop device for the table, devices for opening the grippers provided for each of said mechanisms, and an actuating mechanism common to all of the said mechanisms and to the table.

10. In a machine for manufacturing paper receptacles, the combination with a support, a combined cutting and shaping mechanism carried by said support, including male and female cutting dies and male and female shaping dies having corrugated opposing faces, the female shaping die having an opening therein the wall of which is corrugated, a corrugated plunger having movement through all of the said dies, and a paper-feed mechanism adapted to pass paper in a continuous sheet between the said dies, of a series of flanging mechanisms also carried by the said support, each provided with a male and female turning die, one of the male dies being provided with ratchet teeth and being capable of rotary as well as of vertical movement and the other male dies being capable of vertical movement only, a revolving table, grippers carried by the table, adapted to convey receptacles from one mechanism to the other, a stop device for the table, releasing devices for the grippers provided for each of the said mechanisms, and an actuating mechanism common to the cutting and shaping mechanism, the flanging mechanisms, the paper-feed mechanism and the said table.

11. In a machine for the manufacture of paper receptacles, the combination with a fixed female cutting die and a fixed female shaping die located within the female cutting die, the female shaping die being provided with a concaved corrugated upper face and a central opening having its walls corrugated correspondingly to its upper face, said female shaping die being also provided with a heating chamber surrounding the opening therein, of a male cutting die, a male shaping die secured to and within the said male cutting die, the male shaping die being provided with a corrugated under face, both of the male dies being provided with a central opening, a corrugated plunger head adapted for movement through the openings of all of the dies, a stripping device for the cutting dies, and means for independently operating the plunger head and the said male dies.

12. In a machine for the manufacture of paper receptacles, the combination with a fixed female cutting die and a fixed female shaping die located within the female cutting die, the female shaping die being provided with a concaved corrugated upper face and a central opening having its walls corrugated correspondingly to its upper face, said female shaping die being also provided with a heating chamber surrounding the opening therein, of a male cutting die, a male shaping die secured to and within the said male cutting die, the male shaping die being provided with a corrugated under face, both the male dies being provided with a central opening, a corrugated plunger head adapted for movement through the openings of all of the dies, a stripping device for the cutting dies, means for independently operating the plunger head and the said male dies, a paper-feed mechanism adapted to feed paper between the male and female dies, and means for operating the said paper-feed mechanism through the same source of power as the said male dies and plunger head.

13. In machines for the manufacture of paper receptacles, the combination with a cutting and shaping mechanism, comprising fixed female cutting and shaping dies, the fixed female shaping die being provided with a corrugated upper face and a central opening the wall of which is also corrugated, movable male cutting and shaping dies, each provided with a central opening, the under face of the male shaping die being corrugated, and a corrugated plunger head adapted to operate through the openings of all of the dies, of a flanging mechanism operating conjointly with the said cutting and shaping mechanism, and means for driving both mechanisms from the same source of power, the male dies of the cutting and shaping mechanism being operated independently of the said plunger head.

14. In a machine for manufacturing paper receptacles, the combination with a mechanism embodying cutting and shaping dies, of a flanging mechanism coöperative with the cutting and shaping mechanism, the flanging mechanism comprising a fixed female die, a male die adapted thereto and provided with exterior ratchet teeth, the male die being adapted for guided vertical and rotary movement, and an actuating mechanism common to both the cutting and shaping mechanism and to the flanging mechanism.

15. In a machine for the manufacture of paper receptacles, the combination with a cutting and shaping mechanism, of a flanging mechanism, which flanging mechanism consists of a fixed female turning die, a plunger, a head carried thereby, a male turning die having rotary and vertical movement in the said head, the male turning die being provided with exterior ratchet teeth at its lower portion, a driving mechanism common to both the cutting and shaping mechanism, and the flange mechanism, and means for conducting material from one mechanism to the other.

16. In machines for the manufacture of paper receptacles, a flanging mechanism comprising a support, a female die carried by said support, provided with interior corrugations, a spring-controlled disk movable in the said female die, a plunger head, a spring-controlled male die located in the plunger head and adapted for vertical and turning movement, a spring-controlled disk having sliding movement in the male die, being suspended therefrom, and means for imparting movement to the plunger head and from the plunger head to said male die.

17. In a flanging mechanism for machines for the manufacture of paper receptacles, the combination with a support, a female die carried by said support, provided with interior corrugations, and a spring-controlled disk vertically movable in the said female die, of a plunger head having angular slots therein, the lower member of each slot being diagonal and the upper member straight, a male die loosely mounted in the said plunger head, having its lower portion provided exteriorly with ratchet teeth, projections from the male die extending through the slots in the plunger head, springs of different tension bearing upon the said male die, a spring-controlled guide disk suspended from the said male die, and means for imparting movement to the said plunger head.

18. In a flanging mechanism for machines for the manufacture of paper receptacles, the combination with a support, a casing secured thereto, a second casing extending down therefrom, a female die provided with inner corrugations located in the first-named casing, a disk located within the chamber of the female die, a rod attached to said disk extending down through both casings, being provided with a collar in the lower casing, and a spring located in said lower casing bearing against said collar, of a plunger head having its lower edge inclined and provided with a series of angular slots the lower members whereof are diagonal and the upper members straight, a guide rod mounted for sliding movement in the plunger head, a collar on the guide rod, a male die secured to the guide rod below said collar, being provided with a chamber and with exterior ratchet teeth, projections from the male die, extending through the slots in the plunger head, a spring located within said plunger head and bearing downwardly against the collar on the guide rod, a spring intervening between the said collar and the said male die, a guide disk located below the male die, a rod connected with the guide disk and extending within the chamber of the die, a spring located in said chamber of the die, exerting downward pressure on the said disk-carrying rod, the spring controlling the disk-carrying rod being of greater tension than the spring controlling the disk-carrying rod of the female die, and the spring controlling the guide rod for the male die being of greater tension than that of any of the other springs, and means for imparting movement to the said plunger head.

19. In machines for the manufacture of paper receptacles, a flanging mechanism comprising a female die, a support therefor and a spring-controlled auxiliary female die having sliding movement at the exterior of the main female die, the upper face of the auxiliary female die being concaved, a tension-controlled male die, a carrier therefor, said male die being provided with a concaved exterior upper portion and the carrier with an inclined lower portion and a straight shoulder meeting the concavity in the male die, and means for actuating the die carrier.

20. In machines for the manufacture of paper receptacles, a female die having corrugations therein, a support therefor, a tension-controlled male die having ratchet teeth exteriorly located at its lower portion and an exterior concaved surface above the ratchet teeth, a carrier for the said male die, having angular slots therein and provided with an inclined lower edge, extensions from the said male die, which extend into the slots of the carrier, and means for moving the carrier to and from the male die.

21. In machines for the manufacture of paper receptacles, a female die having corrugations therein, a support therefor, a tension-controlled male die having ratchet teeth exteriorly located at its lower portion and an exterior concaved surface above the ratchet teeth, a carrier for the said male die, having angular slots therein and provided with an inclined lower edge, extensions from the said male die, which extend into the slots of the carrier, means for moving the carrier to and from the male die, a spring-controlled disk pendent from the male die, and an opposing spring-controlled disk located within the female die.

22. In machines for the manufacture of paper receptacles, a female die, a support therefor, a spring-controlled ring-shaped auxiliary female die mounted to slide exteriorly upon the main female die, said main female die being provided with a sharp upper edge, a spring-controlled disk mounted for movement in both of the female dies, a carrier, a tension-controlled male die adapted to mate with the main female die, having vertical movement in the said carrier, the male die being provided with an exteriorly concaved upper surface and the carrier with an inclined lower side portion and a straight bottom adapted to register with the concaved surface of the male die, a spring-controlled disk pendent from said male die, and means for actuating the disk carrier.

23. In machines for the manufacture of paper receptacles, a support, cutting and shaping mechanisms, a flanging mechanism, and a closing mechanism carried by the said support, a carrier for material movable relatively to all of said mechanisms, an actuating mechanism common to said carrier and to the shaping and cutting mechanisms, for the flanging and closing mechanisms, and means for automatically and continuously supplying material to said cutting and shaping mechanisms.

In testimony whereof I have signed my name to this specification in the presence of two subscribing witnesses.

CHARLES TIETZMANN.

Witnesses:
  J. FRED. ACKER,
  JNO. M. RITTER.